United States Patent [19]

Shuknecht et al.

[11] Patent Number: 5,376,046

[45] Date of Patent: Dec. 27, 1994

[54] HARVESTING APPARATUS USING PRESSURIZED AIR AND IMPROVED BLOWER FOR PROVIDING PRESSURIZED AIR

[75] Inventors: Lee N. Shuknecht; Dale J. Shuknecht, both of Elba, N.Y.

[73] Assignee: Lee Shuknecht & Sons, Elba, N.Y.

[21] Appl. No.: 102,602

[22] Filed: Aug. 5, 1993

[51] Int. Cl.[5] .................................................. A01F 12/48
[52] U.S. Cl. ...................................... 460/99; 460/100; 171/17
[58] Field of Search .................. 460/100, 99, 123; 171/17, 41; 56/12.8, 327.1, 121.44

[56] References Cited

U.S. PATENT DOCUMENTS

| | | | |
|---|---|---|---|
| 2,849,118 | 8/1958 | Ashton | 460/100 X |
| 3,603,063 | 9/1971 | Stroburg | 460/99 X |
| 4,035,993 | 7/1977 | Bell et al. | 56/13.1 |
| 4,174,001 | 11/1979 | Ellis | 171/17 |
| 4,235,293 | 11/1980 | Ellis | 171/17 |
| 4,753,296 | 6/1988 | Kruithoff | 171/26 |
| 5,024,278 | 6/1991 | Shuknecht | 171/17 |
| 5,107,664 | 4/1992 | Ross et al. | 56/121.4 |
| 5,193,331 | 3/1993 | Quandt | 56/12.8 |
| 5,197,549 | 3/1993 | Shuff | 171/17 |

FOREIGN PATENT DOCUMENTS

1724 of 1891 United Kingdom .................. 460/99

Primary Examiner—Terry Lee Melius
Attorney, Agent, or Firm—M. Lukacher

[57] ABSTRACT

A machine for harvesting onions utilizes a blower which provides a stream of air through a duct, having an opening across which the onions pass and are topped. The blower has a bladed fan in a cylindrical housing open at both ends. The fan blades are supported by arms which, with the blades, define a support truss for each blade in the form of a triangular structure, having arms meeting at an apex connected approximately midway of the end of the cylindrical housing and a base provided by the blade to which the arms are connected. A rigid support is provided together with an enlarged and substantially unobstructed intake passageway for air along the axis of rotation of the fan which is pressurized and forced through the duct, using less horsepower and fuel than conventional fans of like size and air flow. The air flow is controllable in air pressure by a shear plate which is moveable into and out of the cylindrical housing and the air direction is adjustable by a vane provided by a sidewall of the duct adjacent to the outlet and may also be controlled in direction by vanes in a hood over the duct outlet.

20 Claims, 6 Drawing Sheets

HARVESTING APPARATUS USING PRESSURIZED AIR AND IMPROVED BLOWER FOR PROVIDING PRESSURIZED AIR

DESCRIPTION

The present invention relates to harvesting apparatus and particularly to harvesting apparatus utilizing pressurized air in harvesting operations. The invention provides an improved blower, especially suitable for providing pressurized air for crop harvesting purposes.

The invention is especially suitable for use in a harvesting means for automatically topping and loading of crops such as onions, by providing a stream of air through a region across which a conveyor carrying the onions passes, so as to extend the onion tops for clipping while allowing debris to separate from the topped onion bulbs. Such an onion harvesting machine is the subject matter of U.S. Pat. No. 5,024,278 issued Jun. 18, 1991, to Lee N. Shuknecht.

Blowers, especially for agricultural crop harvesting purposes, have conflicting requirements. One of these requirements is that a large volume of air must be pressurized and moved. By pressurized is meant both pressurization above and below atmospheric pressure; below atmospheric pressure being suction. The other of these conflicting requirements is that a fan blade structure be sufficiently rigid and strong as to withstand the forces which are applied to the fan blades (both centrifugal and axial forces) which tend to tear the blade assembly apart. The blowers typically are three feet in diameter as measured to the tips or outer edges of the fan blades and four feet long in the axial direction. To obtain the air flows and pressures required for agricultural harvesting, rotation rates of from 600 to 1200 RPM are typical.

Figure 1:
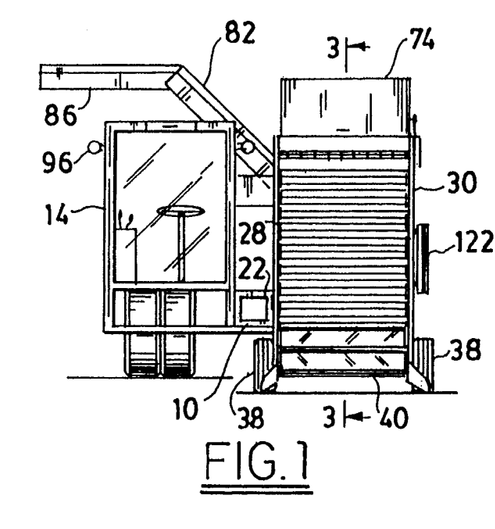
FIG. 1 is a front elevational view of a harvesting machine embodying the invention.
Figure 2:
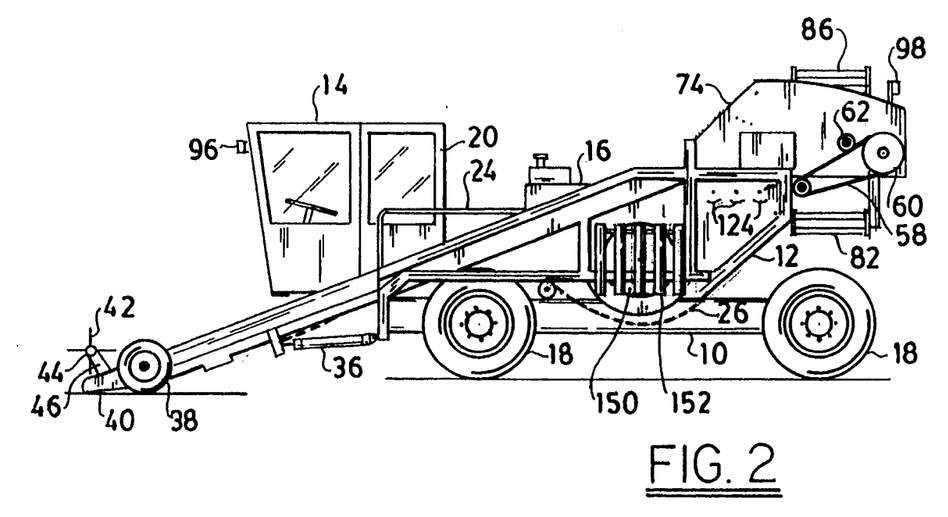
FIG. 2 is a side elevation of the machine shown in FIG. 1.
Figure 3:
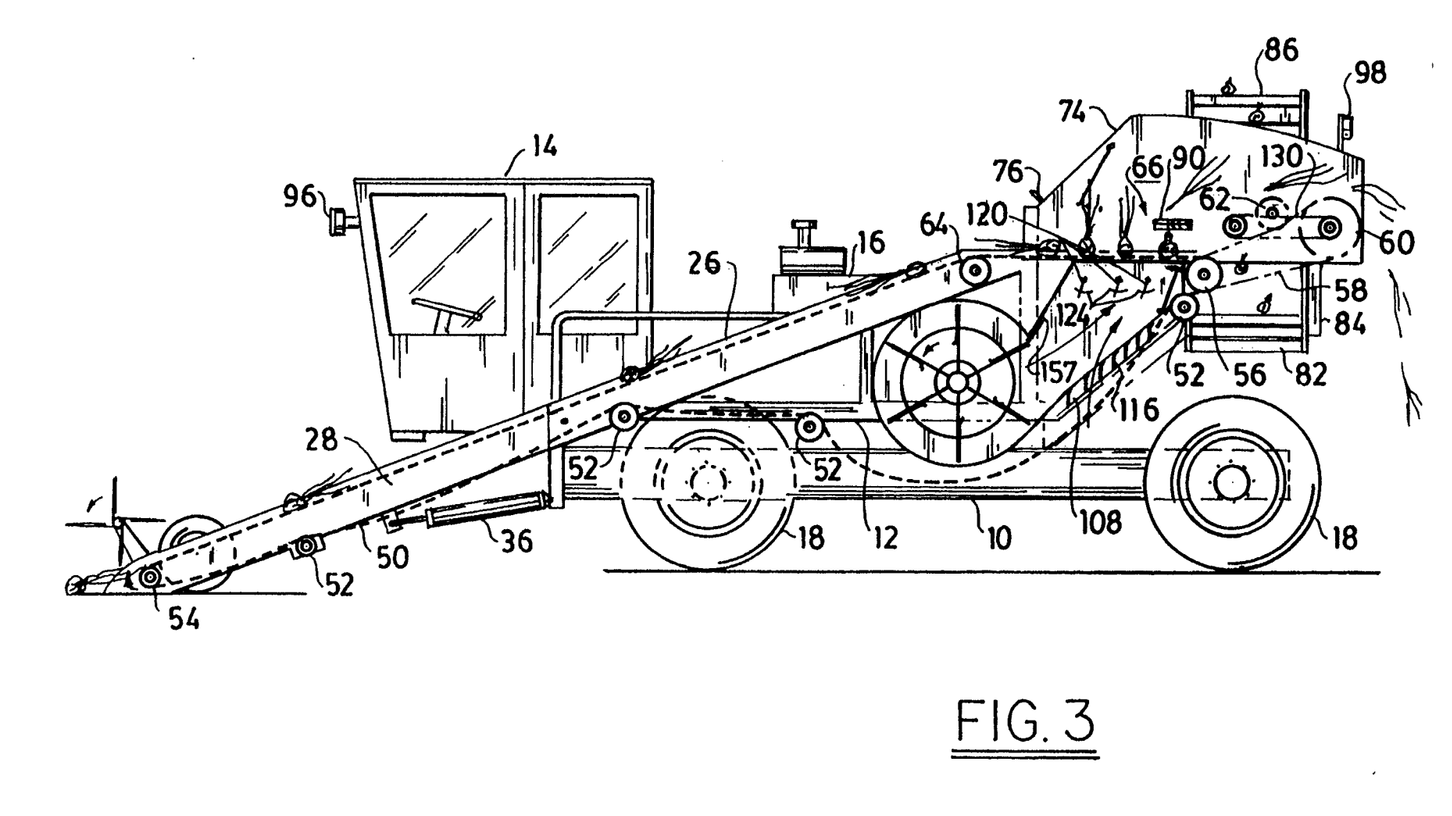
FIG. 3 is a sectional view taken along the lines 3—3 in FIG. 1.
Figure 4:
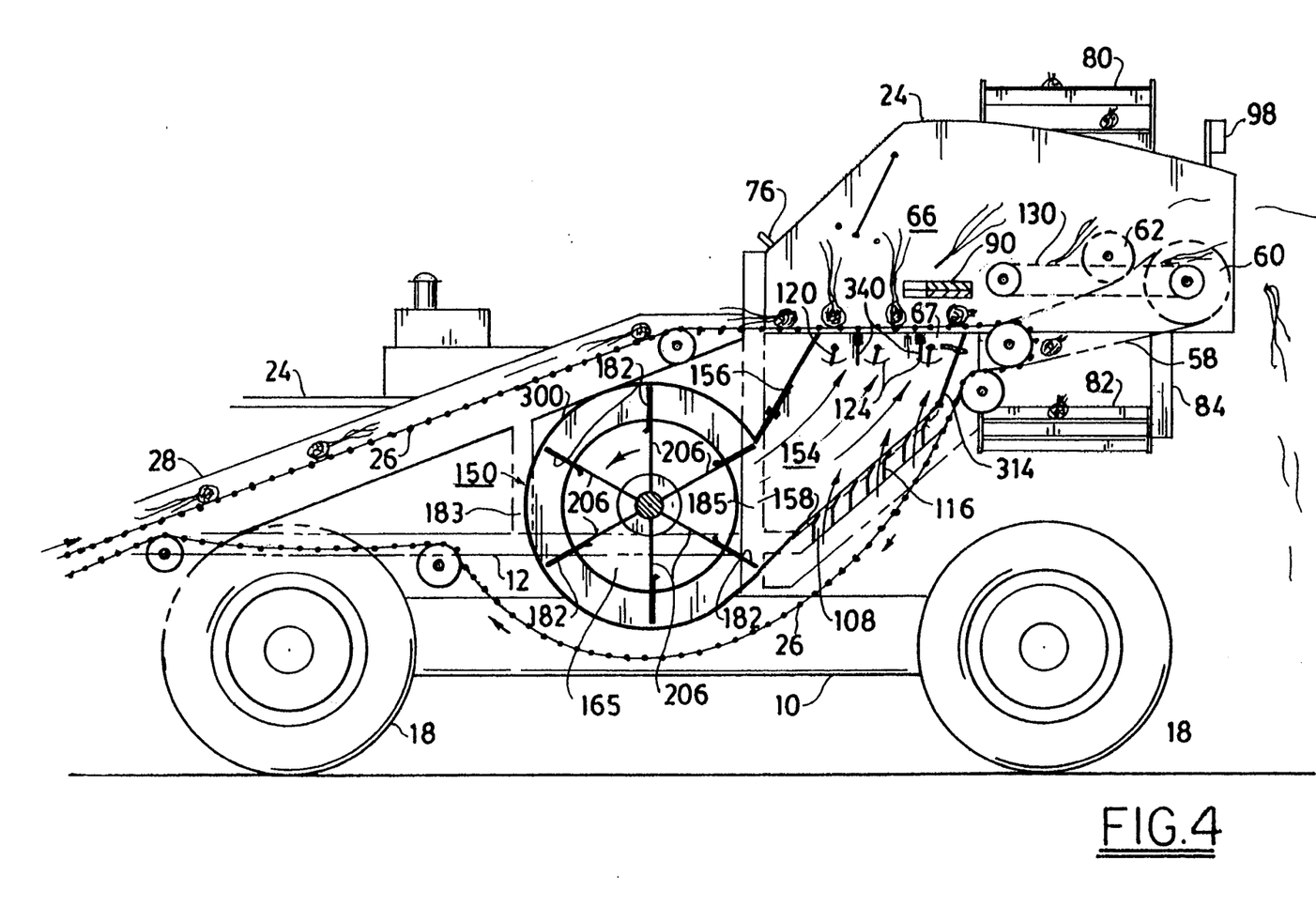
FIG. 4 is an enlarged fragmentary cross-sectional view of the rear of the machine shown FIG. 3 illustrating the topping and loading mechanism, and an improved blower and air pressure and direction control means which are provided in accordance with the invention.
Figure 5:
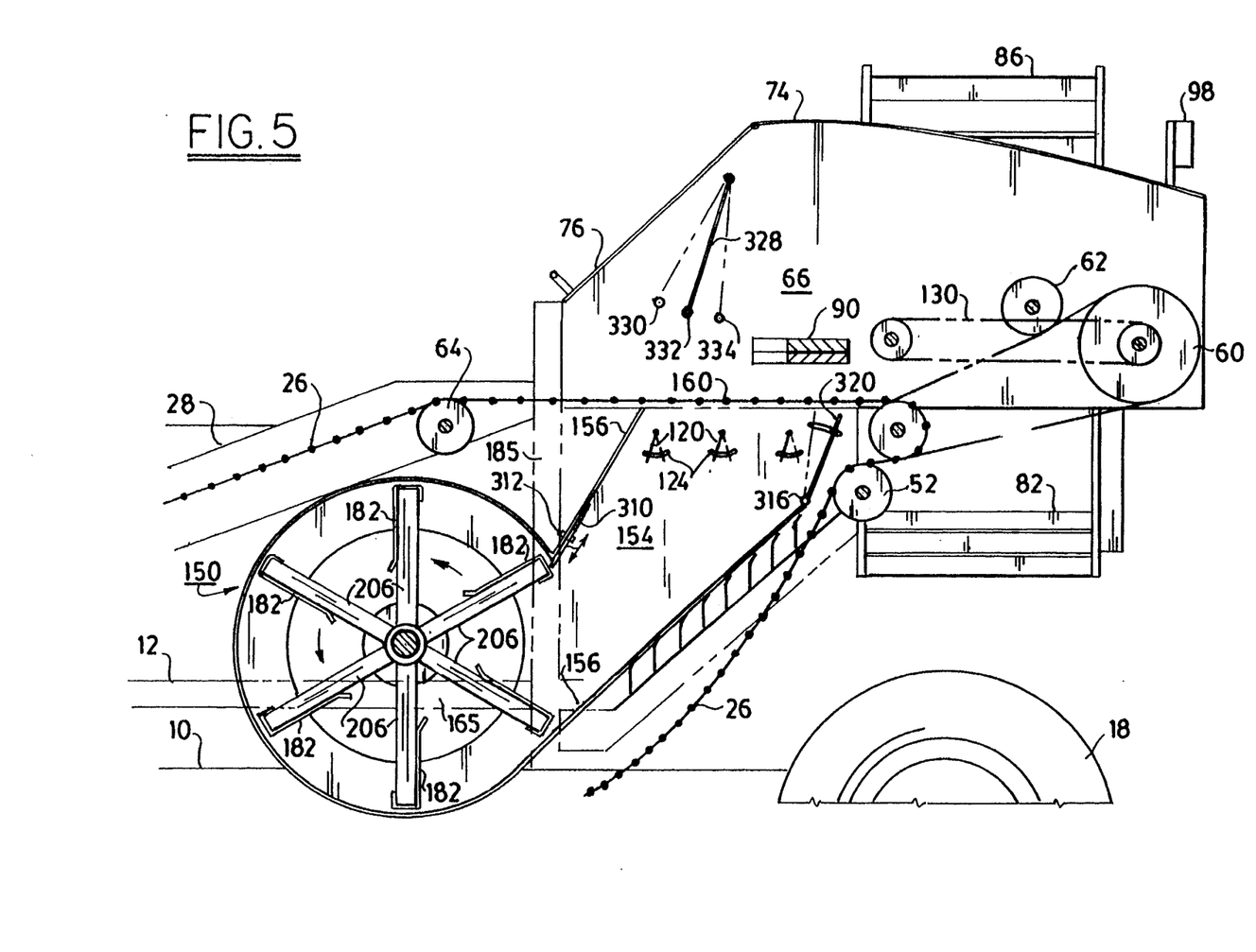
FIG. 5 is an enlarged fragmentary view illustrating the blower and the pressurization and direction control means shown in FIG. 4 in greater detail.
Figure 6:
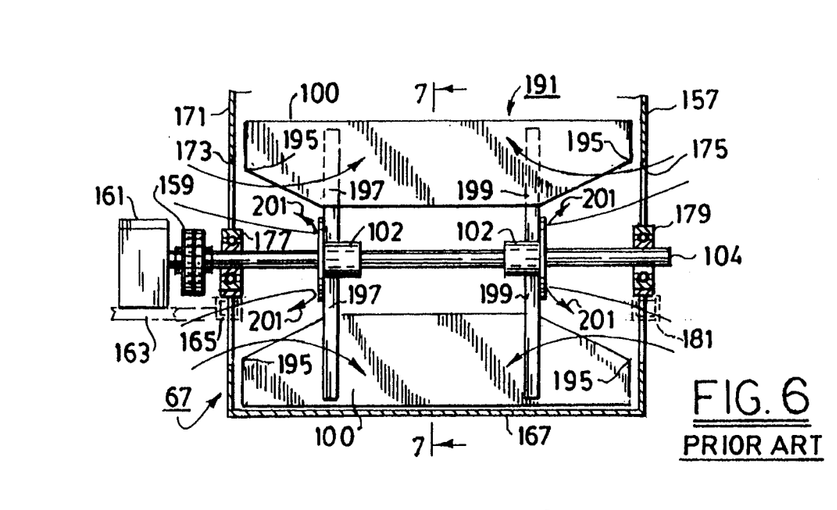
FIGS. 6 and 7 are views of a blower of the type shown in the above-referenced Shuknecht patent, FIG. 6 being a sectional view along a vertical plane through the axis of rotation of the shaft of the blower, and FIG. 7 being a sectional view in a plane perpendicular to the shaft axis and along the lines 7—7 in FIG. 6.
Figure 7:
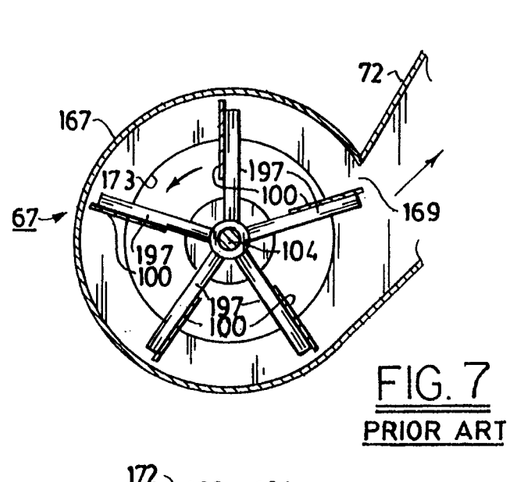

In prior blowers, the capacity and also the efficiency of the blower has been limited by the air intake area. The intake area has been limited by virtue of the structures necessary to support the fan blades. Typically, the length of the blade must be shortened, so that it can be supported by a flange which extends the entire diameter of the fan and to which the blades are connected, thus both air flow capacity and efficiency have been limited by the structural support for the blade in some blowers. Blowers of such design are shown, for example, in the following U.S. Patents: Ellis U.S. Pat. No. 4,235,293, Nov. 25, 1980 and U.S. Pat. No. 4,174,001, Nov. 13, 1979 and also in Quandt U.S. Pat. No. 5,193,331, Mar. 16, 1993; Bell U.S. Pat. No. 4,035,993, Jul. 19, 1977; Ross U.S. Pat. No. 5,107,664, Apr. 28, 1992 and Kruithoff U.S. Pat. No. 4,753,296, Jun. 28, 1988. The above-referenced Shuknecht patent and onion harvesting equipment of the type described therein which is sold by Lee Shuknecht & Sons, Inc., of Elba, N.Y., U.S.A., utilizes large, high air flow capacity blowers. The air intake is limited in size by flanges on hubs which are connected to the shaft for rotating the fan blades. Such blowers are illustrated in FIGS. 6 and 7 and will be discussed in greater detail hereinafter.

It has been discovered in accordance with the invention that the air intake area and the passageway for air into the blower to the blades thereof, can be increased without sacrificing strength of the fan assembly. By virtue of its increased intake area, which is substantially unobstructed, the efficiency of the blower is increased and the air pressure at the outlet of a duct through which the air passes for harvesting operations can be increased about 15%. The saving in fuel to operate the motors which drive the blower, reduces the cost of harvesting operations. Another feature of the blower is that the area of each blade may be reduced but, by virtue of the supporting means for the blades, more blades can be accommodated in the blower housing, thereby further enhancing the air flow capacity and efficiency of the blower.

The invention also includes improved means for controlling the air pressure produced by the blower and also for controlling the direction of the air flow at the exit of the blower. The latter is accomplished, in accordance with the present invention, by shear plates and vanes which are associated with the wall of the duct which communicates air between the blower housing and the region where the crop is processed by the pressurized air.

Accordingly, it is the principal object of the invention to provide improved, air-assisted harvesting apparatus wherein the air is provided by an improved blower, in which the air intake to the blower is increased in area without weakening the blower structure.

It is a further object of the invention to provide an improved blower having a blade assembly, which provides capability for increased pressurization of air without sacrificing efficiency, and indeed, with improved efficiency.

It is a still further object of the invention to provide improved harvesting apparatus, using air assistance for conveyance of the crop or portions thereof, and also for the separation of debris and other undesirable material from the crop.

It is the still further object of the invention to provide an improved harvesting apparatus using pressurized air flow in a region through which the crop passes in the process of being harvested wherein the pressure of the air, and the direction of the air, may be controlled in a simple and expedient manner.

Briefly described, harvesting apparatus in accordance with the invention utilizes pressurized air for crop and debris separating purposes and includes a blower having a housing. A fan is rotatable in the housing. A driven shaft defines an axis of rotation for the fan. The fan also has a plurality of blades circumferentially spaced from each other around the axis of rotation and spaced radially away from the axis. A plurality of pairs of arms are used in a support structure for the blades, which enables enlargement and removal of obstructions of the air intake to the blower, without weakening of the fan so that the fan can withstand the forces which tend to tear it apart as it rotates and pressurizes the air. This structure includes a plurality of pairs of arms. Each of the blades and each of the pair of arms are connected to define a truss. In the truss, the arms are connected, closely spaced to each other, to the shaft, and preferably to flanges attached to the hub, approximately midway of the ends of the housing through which the air passes, into a passageway around the shaft. The arms of the truss diverge from each other and are connected to the blades. The truss defines a triangle with two sides provided by the arms, and connected at the apex of these sides to the shaft. The base of the triangle is provided by the blades to which the arms are also attached. The truss therefore supports the blades spaced radially from the shaft and circumferentially about the shaft, to provide a substantially unobstructed intake passageway for air along the axis of rotation.

In a preferred form of the blower, the arms and the flanges are mounted on hubs, which define a spider assembly which is attached at the outer ends of the arms to the blades. The blower housing may be connected to an outlet in the wall thereof, via a duct to an exit at a region over which the crop passes. The pressure of the air at the exit is controllable by a shear plate which provides part of the wall of the duct, and is moveable inwardly and outwardly of the blower housing. The air direction is controllable by a vane provided by a hinged section of a wall of the duct, which is moveable with respect to the outlet exit. In addition, a vane may be provided in a hood, over the duct exit and through which the crop passes.

The foregoing and other objects, features and advantages of the invention will become more apparent from a reading of the following description in connection with the accompanying drawings in which:

Referring to FIGS. 1 through 5, there is shown a self-propelled onion harvesting machine, which embodies the air assisted harvesting features provided by the present invention. The above-referenced Shuknecht U.S. Pat. No. 5,024,278 shows such an onion harvesting machine, and is incorporated herein by this reference. Components and assemblies similar to those shown in the Shuknecht Patent are identified by like reference numerals. FIGS. 6 and 7 illustrate a blower 67 like that shown and described in the referenced Shuknecht Patent. The illustrated onion harvesting machine and the blower and air pressure control and direction features of this invention are preferably used in assisting harvesting operations by forcing air through the crop. The blower of this invention may also be used in harvesting, utilizing pressurized air to move the crop as by creating a vacuum which draws the air back into the blower. Material handling for conveyance through the use of a vacuum which moves the crop or other material into the blower, is presently not preferred, since those systems are less reliable and require more maintenance than systems which use forced air from the blower to move the crop or parts thereof, such as the tops of the onions in the herein illustrated onion harvesting machine. Vacuum systems tend to be less reliable and require more maintenance because material, such as wet dirt, is difficult to keep out of the blower. When drawn into the blower, such material contaminates the blower and may cause out of balance conditions which lead to vibration, which may cause damage. Thus, the machine must be stopped frequently for cleanout purposes.

In the herein illustrated onion harvesting machine, the picking section at the scoop 40 scrapes the ground and may penetrate it to a depth of up to an inch and a half. The paddle 42 urges the onions up onto the chain conveyor 26. The paddle and chain rotate in opposite senses and are driven via a common sprocket 54. The conveyor 26 is a chain conveyor with spaces which hold the onions and permit stones and dirt to drop to the ground. When the onions reach a region 66 at the top of the machine, they are subject to pressurized air from the blower 150 which is directed to a duct 154 with front and rear walls 156 and 158. The forced air enters into the region 66 above the exit outlet 67 of the duct 154, and extends the tops of the onions so that they can be cut off by a sickle bar cutter 90. The tops then are blown through the hood 74. The tops are assisted in leaving the hood through the rear open end thereof by a discharge belt 130. The illustrated onion harvesting machine has one side harvesting unit 41 mounted on the chassis 10. The chassis has a pair of hollow tubular beams, the longitudinal one of which is illustrated. The transverse beam is not illustrated. The framework 12 of the harvesting unit 41 is built onto the chassis. Another, similar harvesting unit may be provided on the opposite side of the cab 14. This other harvesting unit increases the harvesting capacity of the machine and may use the same engine 16 to power hydraulic motors which turn the shafts and operate the hydraulic cylinders of the machine.

The blower 67 of the harvesting machine shown in the referenced Shuknecht Patent, and as illustrated in FIGS. 6 & 7, utilizes hydraulic motors to drive the shaft or axle 104 of the blower 67. One such motor 161 is illustrated. It is connected to the shaft 104 by way of a coupling to accommodate flexing and misalignments between the shaft 104 and the motor 161. The motor 161 is mounted on a plate 163 which is connected to a horizontal member 165 of the frame 12. This horizontal member may be connected to the plate 163 as by welding. The blower includes a cylindrical housing 167 with an opening 169 in the cylindrical sidewall thereof to which the duct 72 (FIG. 7) is connected as by welding. The housing 167 has circular end plates 171 and 172 which provide the opposite ends of the housing 167. Circular openings 173 and 175 provide for the entry of inlet air into the housing 167.

The shaft is driven to the coupling 159. Another coupling and another hydraulic motor may be provided on the opposite end of the shaft if desired. The coupling 159 is a commercial type chain coupling. The shaft is supported on pillow blocks 177 and 179, having bearings therein. The pillow blocks 177 and 179 rest on horizontal members 165 and 181 of the frame 12. The end plates are desirably welded to these members and also may be welded to vertical members 183 and 185 of the frame 12. There are pairs of these vertical members 183 and 185 which are spaced from each other as are the horizontal members 165 and 181. The blower 67 may be dropped into the space between these frame members, and the end plates 171 and 172 welded in place. The blowers include a fan assembly 191 which may be assembled with the shaft 104 after the blower housing is welded in place.

The openings 173 and 175 are of a diameter approximately equal to the inner diameter of the blades or paddles 100 of the fan at the inner edges 195 of the inner ends of the blades 100. Because the blades are relatively wide, in order to obtain the air pressurizations and flow required from the five blades 100, the diameter of the openings 173 and 175 is therefore restricted.

The fan includes the blades 100, which are connected to arms 197 and 199, which now attach to flanges of hubs 102 and to the blades 100. The flanges of these hubs obstruct the air inlet and the inlet passage for air into the blower housing and can deflect the inlet air away from the blades 100 as indicated by the arrows 201.

Figure 8:
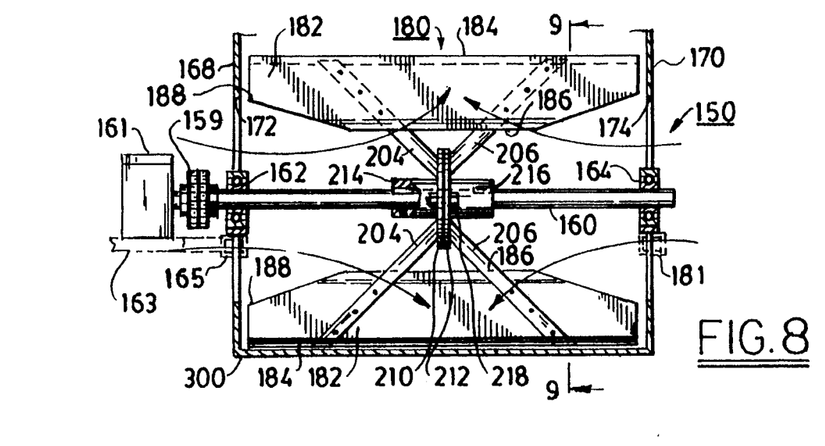
FIGS. 8 and 9 are views similar to FIGS. 6 and 7, but showing the improved blower in accordance with the invention.
Figure 9:
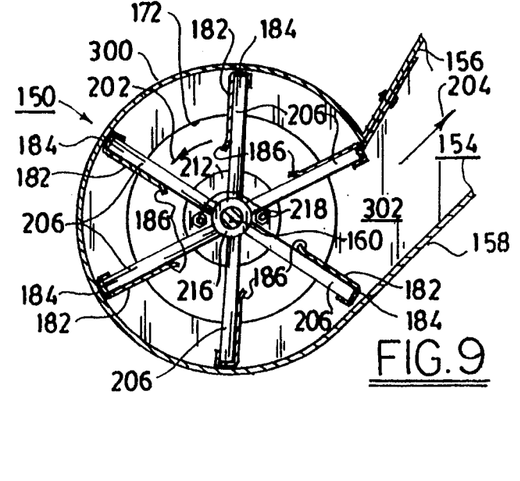

The improved fan provided by the invention as shown in FIGS. 8 and 9 has a cylindrical housing 300 with an outlet side opening 302, leading to a duct 154, having front and rear walls 156 and 158. The opening 302 extends approximately 90 degrees around the axis of the blower 150, which is defined by the axis of its drive shaft 160. Pillow blocks 162 and 164 support the shaft on horizontal frame members 165 and 181, to which the base plate 163 are connected. The shaft 160 is driven by an hydraulic motor 161, through a chain coupling 159, as described in connection with FIG. 6.

The housing 300, has circular end plates 168 and 170, with openings 172 and 174 coaxial with the shaft 160. These openings are larger than the openings 173 and 175 in the end plates 171 and 157 of the blower shown in FIG. 6.

The blower 150 has a fan assembly 180, having six blades 182 which are generally rectangular in shape and have outer edges 184 or tips and inner edges 186. The blades 182 are narrower between their tips 184 and inner edges 186 than are the blades 100. In other words, the width of the blades 100 is wider than the width of the blades 182. There are more blades in the blower 150. The fan 150 has six blades arranged in pairs, which are in balanced relationship 180° opposite to each other. Additional pairs of blades may be provided in the blower 150. Then the blades may be made still narrower in width for the same air pressure and flow from the blower. The opening 172 and 174 may then be still wider for a larger air inlet area. For example, an eight-bladed blower may be accommodated in a blower housing of the same size.

The blower is relatively large and provides high air flow of from 600 to 1200 cubic feet per minute (CFM). The blades may be approximately four feet long and nine inches wide (as compared to 12 inches wide for the blades in the blower 67 shown in FIGS. 6 and 7). Because the passage for inlet air to the blades 182 is substantially unobstructed, there are no dead spots or non-uniform air distribution across the length of the outlet 302. The blades may be widened, for example, from 48 inches in length to 60 inches in length if a larger air outlet or larger duct 154 is to be accommodated.

Figure 10:
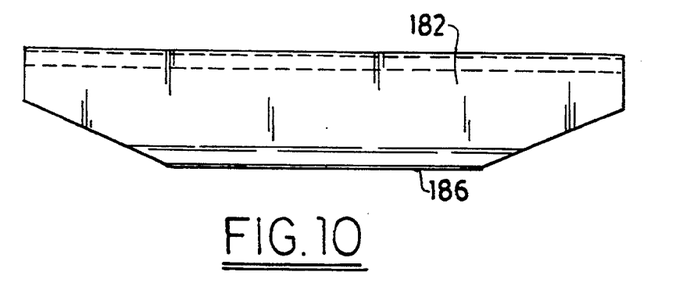
FIG. 10 is a front elevation view of a blade of the blower shown in FIGS. 8 and 9.
Figure 11:
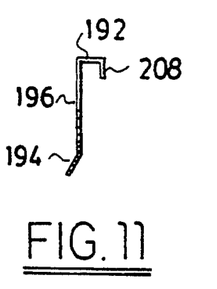
FIG. 11 is an end view of the blade shown in FIG. 10.
Figure 12:
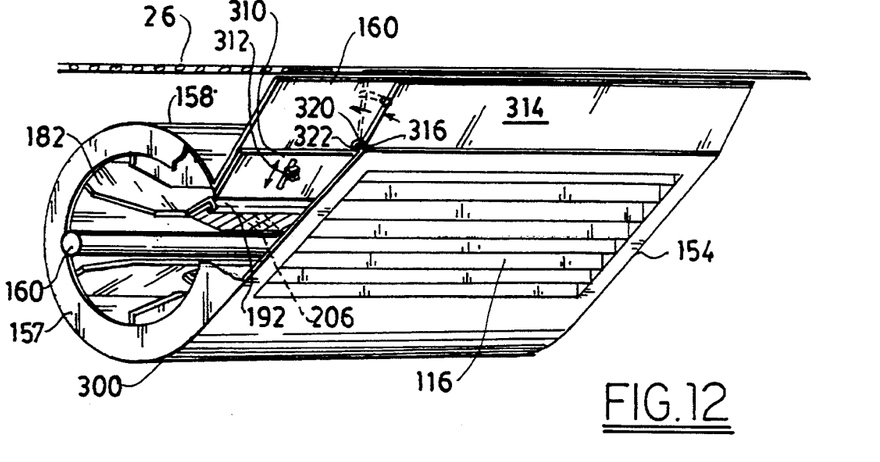
FIG. 12 is a perspective view of the blower shown in FIGS. 5, 8 and 9, and the duct which is connected to the housing thereof.

The blades are made of plates, for example, $\frac{3}{8}''$ thick of steel, and as shown thus in FIGS. 10 and 11 have strengthening lips 192 and 194 along their outer and inner tips 184 and 186. The lip 192 is bent into a channel and the lip 194 is bent at an obtuse angle to the surface 196 facing in the direction in which the blade rotates as shown by the arrow 202 in FIG. 9. This angle may be approximately 120°. The lip 194 acts as a scoop to collect the inlet air and assists the blades in pressurizing the inlet air to provide the stream of outlet air indicated by the arrow 204 in FIG. 9. The channel or slot-shaped lip 192 has as its principal purpose the strengthening and rigidifying of the blade 182 along its length, thereby preventing flexing and also accommodating the arms 204 and 206. The outer bend 208 of the channel lip 192 flares away from the blade to facilitate cleaning. Also the arms 204 and 206 are bolted to the blades after being chamfered at their opposite ends, but the bolts do not extend through the channel to facilitate the release of debris or the cleaning of the blades of debris during maintenance operations.

The blades 182 and the arms 204 and 206 define structural trusses which support the blades in the fan assembly 180 rigidly and with sufficient strength to sustain the centrifugal and axial forces on the blades which tend to tear them apart from the shaft 160. These trusses are assembled to flanges 210 which are welded to the ends of hubs 214 and 216. The flanges and hubs may be welded and the faces of the flanges 210 and 212 which abut each other are machined flat in the process of machining holes through the hubs and flanges for insertion of the shaft 160. The shaft may have a keyway cut therein and the hub may have an internal keyway for keying the hubs to the shaft. The flanges have holes 180° apart through which bolts are inserted to assemble the hubs to the shaft midway of the shaft, that is, in the center between the end plates 167 and 170 of the housing 300. There may be three such aligned holes, 120° apart, or four holes, 90° apart for additional strength if desired. Set screws may also be inserted through the hubs and through the keys in the keyway (not shown) for securing the hubs and flanges 214, 216, 210, 212 to the shaft.

The apex of the arms 204 and 206, which include a 90° angle, are welded to the outside faces of the flanges 210 and 212. Then the arms are bolted to the blades 182. The hub 214, flange 210, and the arms 204 are welded to the flange 210, and may be provided as a left-hand assembly while the hub 216, flange 212 and arms 206 may be provided as a right-hand assembly. They may be inserted onto the shaft, centered, and bolted together by bolts 218 and 220 after the flanges are aligned and centered on the shaft 216. The lower ends of the arms 204 and 206 are chamfered, and welded to the outside faces of the flanges 210 and 212. These faces have a circular perimeter, which may have a diameter of approximately 25% of the diameter of the fan assembly 180, thereby providing a strong and large area face for the trusses defined by the arms 204 and 206 and the blades 182. The trusses are provided by the arms 204 and 206 and the blades 182 and are triangular in shape. They provide sufficient support for the blades without substantially obstructing the inlet air passage to the blades. The direction of the airstream is provided by the vanes and particularly, the hinged vane 314. It has been found that the louvers 116 may be omitted and a large free opening in the area of the louvers 116 permits rocks, stones and other debris to fall to the ground without obstruction or ricocheting about until they fall to the ground. The omission of the louvers also increases the airflow to the exit 67 of the duct. By way of an example, a blower such as shown in FIGS. 6 and 7, which is rotated at 650 RPM (revolutions per minute), required a hydraulic flow of 7.75 gallons per minute (GPM) at an hydraulic pressure of 1700 pounds per square inch (PSI). It required 30 horsepower to operate the blower. The blower, in accordance with the invention and as shown in FIGS. 8 and 9 for the same RPM (650), required a hydraulic flow of 7 GPM at a pressure of 1500 PSI and utilized only 23 horsepower. In addition, the air pressure and flow at the exit outlet 160 of the duct 154 was 15% higher than for the blower 67 shown in FIGS. 6 and 7. The size of the blower was the same. The length of the housing 300 was approximately 50 inches and the diameter of the housing was approximately 40 inches.

Figure 13:
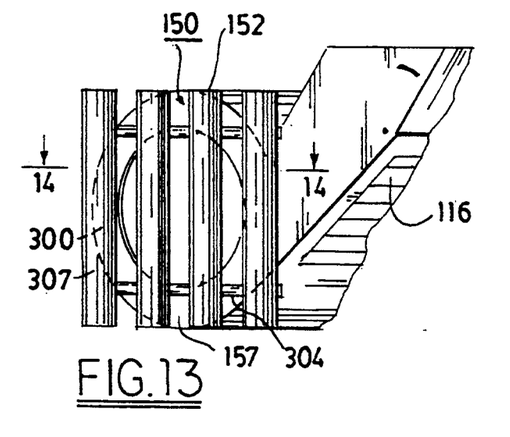
FIG. 13 is an enlarged view of the end of the blowers which are protected by a guard.
Figure 14:
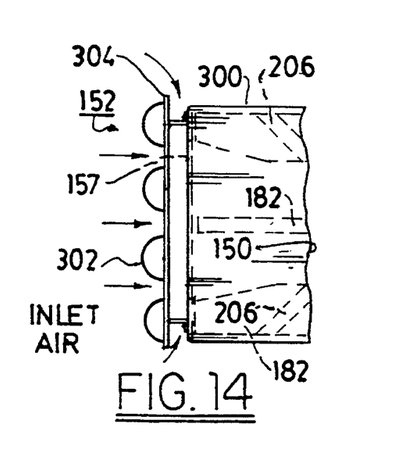
FIG. 14 is a fragmentary sectional view along the lines 14—14 in FIG. 13.

To protect the inlet to the blower 150, a grillwork 152 consisting of hemicylindrical guards 302, mounted on a standoff 304 connected to the end wall 168 of the blower housing 300 is provided. This grill is for personnel safety purposes. A grill on the inside of the blower 300 (opposite to the end plate 168) is not required, since personnel cannot get into this area of the harvesting machine.

The pressurization of the air at the air exit outlet is controllable by a shear plate 310 (see FIGS. 5 and 10) which is moveable inwardly and outwardly of the cylindrical housing. The plate can decrease the effective inner diameter of the housing and prevent blowback of pressurized air into the housing when it is in the position shown in FIG. 5. By moving the plate outwardly, the pressure may be decreased. When the position of the plate is adjusted, it is set in place by bolts 312.

In order to ensure that the air flow is directed over the onions, particularly as they pass into the sickle bar 90, the rear wall 158 of the duct 154 may be provided with a pivotal vane section 314 which extends from a hinge 316 to the air outlet 160 of the duct 154. This vane may have a tab 320 through which a bolt 322 extends. This bolt extends to the side wall of the duct 154 and enables the vane 314 to be located in the desired position. Accordingly, any misalignments of the duct 154 with respect to the sickle bar 90 can be accommodated and exact laminar airflow enhanced. Laminar airflow is also enhanced by a vane 328 which is pivotally mounted across the hood 74, and may be pinned to any of three pivot positions indicated as 330, 332 and 334 (see FIG. 5) thereby providing further control of the direction of flow from the outlet, or exit 160 of the duct 154. Laminar flow is also provided as in the system shown in the above-referenced Shuknecht Patent by adjustable vanes 120 and if desired, stationary vanes 340 (see FIG. 4).

From the foregoing description, it will be apparent that there has been provided improved air-assisted harvesting apparatus, and particularly, an improved harvesting machine, having an improved blower and air pressurization and air direction control means. Variations and modifications in the herein described designs, within the scope of the invention, will undoubtedly suggest themselves to those skilled in the art. Accordingly, the foregoing description should be taken as illustrative and not in a limiting sense.

We claim:

1. Harvesting apparatus using pressurized air for crop and debris separating purposes, and which comprises a blower having a housing, a fan rotatable in said housing, a shaft defining an axis of rotation for said fan, said fan having a plurality of blades circumferentially spaced from each other around said axis and spaced radially away from said axis, a plurality of pairs of arms, each of said plurality of blades and each of said plurality of pairs of arms being respectively connected to define a truss, having said arms connected closely spaced to each other to said shaft, and said arms diverging from each other and being connected to said blades, thereby supporting said blades spaced radially from said shaft and circumferentially about said shaft and providing a substantially unobstructed passageway for air along said axis, which air is moved and pressurized as said fan rotates.

2. The apparatus according to claim 1 wherein said truss is defined as triangular shaped having two sides defined by said arms, meeting at an apex at said shaft and third sides defined by said blades.

3. The apparatus according to claim 2 wherein said two sides include an angle of about 90°.

4. The apparatus according to claim 1 further comprising a flange rotatably connected to said shaft, each of said pairs of arms being connected to said flange to define a spider assembly.

5. The apparatus according to claim 4 wherein said flange is provided by an assembly having a first hub to which a first flange is connected and a second hub to which a second flange is connected, said flanges having faces on one side thereof, said hubs being mounted on said shaft, with said faces of said first and second flanges abutting each other, said arms being connected to said first flange and to said second flange on the sides thereof opposite two said faces to define connections of said trusses to said shaft.

6. The apparatus according to claim 1 wherein said housing is generally cylindrical and has an axis which extends longitudinally through said generally cylindrical housing in the same direction as the axis of said shaft, said housing having opposite ends and said arms being connected to said shaft about midway between the ends of said housing.

7. The apparatus according to claim 6 wherein said opposite ends both have openings which define said passageway for air which communicates with said fan.

8. The apparatus according to claim 6 further comprising a body providing a flange connected to and extending radially from said shaft, and located about midway between the ends of said housing, each of said pair of arms being connected to an opposite side of said flange to define an apex of said truss, about midway between the ends of said housing.

9. The apparatus according to claim 8 wherein said blades have outside edges defining the diameter of said fan, said flange having a diameter of about 25% of the diameter of said fan.

10. The apparatus according to claim 1 wherein each of said blades is provided by a plate which is greater in length than in width, said length being along said axis, said plate having outer and inner edges which are bent to provide lips lending rigidity to said plate, said plate having opposite sides, said lip along said outer edge being bent along one side of said plate and said lip along said inner edge being bent along the side of said plate opposite to said one side.

11. The apparatus according to claim 10 wherein said housing has at least an opening in communication with said passageway at at least one end of said housing, and said lip along said inner edge makes an obtuse angle with said opposite side of said plate and is bent away from said opposite side in the direction of rotation of said fan.

12. The apparatus according to claim 10 wherein said lip along said one side of said plate defines a channel, said arms having ends extending into said channel and being connected to said plate along said one side thereof.

13. The apparatus according to claim 1 further comprising a duct extending from said housing for conveying a stream of said pressurized air to an exit opening, means for conveying said crop across said exit opening, and means in said duct for controlling the pressurization of said air.

14. The apparatus according to claim 13 wherein said pressurization control means comprises a shear plate adjustably moveable inwardly and outwardly with respect to said housing.

15. The apparatus according to claim 1 further comprising a duct extending from said housing for conveying a stream of said pressurized air to an exit opening of said duct across which the crop passes, and means for controlling the direction of air through said opening, which comprises a vane defined by a side of said duct, adjacent to said opening and having a hinge to said duct side at one end thereof and being pivotable about said hinge to direct said air passing through said exit opening.

16. The apparatus according to claim 15, wherein said air direction controlling means further comprises a hood connected across and above said exit opening, and a vane pivotally mounted in said hood over said exit opening and having a pivot access transverse to the direction in which said crop moves across said opening.

17. In a harvester wherein a crop is carried by a conveyor which supports the crop and having openings smaller than the crop through which air can be blown from a blower via a duct into a region through which said conveyor passes, the improvement comprising means on said harvester for supporting said blower offset from said region, said blower having a housing with a generally cylindrical side wall, said side wall having an opening to which said duct is connected, said duct having a plurality of walls, a shear plate connected to one of said plurality of walls and moveable inwards into and outwardly of said housing for controlling the pressure of the air from said blower, which flows into said duct.

18. The harvester according to claim 17 further comprising means for controlling the direction of air from said duct into said region, which comprises a section of at least one of said plurality of walls of said duct, which is hinged at said duct and moveable inwardly and outwardly of said duct, said section defining a vane which directs said air with respect to said region.

19. The apparatus according to claim 18 wherein said controlling means further comprises a hood over said region and a vane pivotally mounted within said hood, for rotation about an axis transverse to the direction in which the crop is carried across said region, and said vane being disposed over said duct outlet.

20. The apparatus according to claim 1, wherein said blades are disposed in pairs, one blade of each of said pairs being spaced about 180° around said axis from the other blade of each of said pairs, each of said blades being part of a separate one of said trusses, said fan having a plurality of said 180° spaced pairs of blades and trusses.

* * * * *